C. E. BEAVER.
HORSE RELEASER.
APPLICATION FILED JAN. 7, 1909.
929,275.
Patented July 27, 1909.
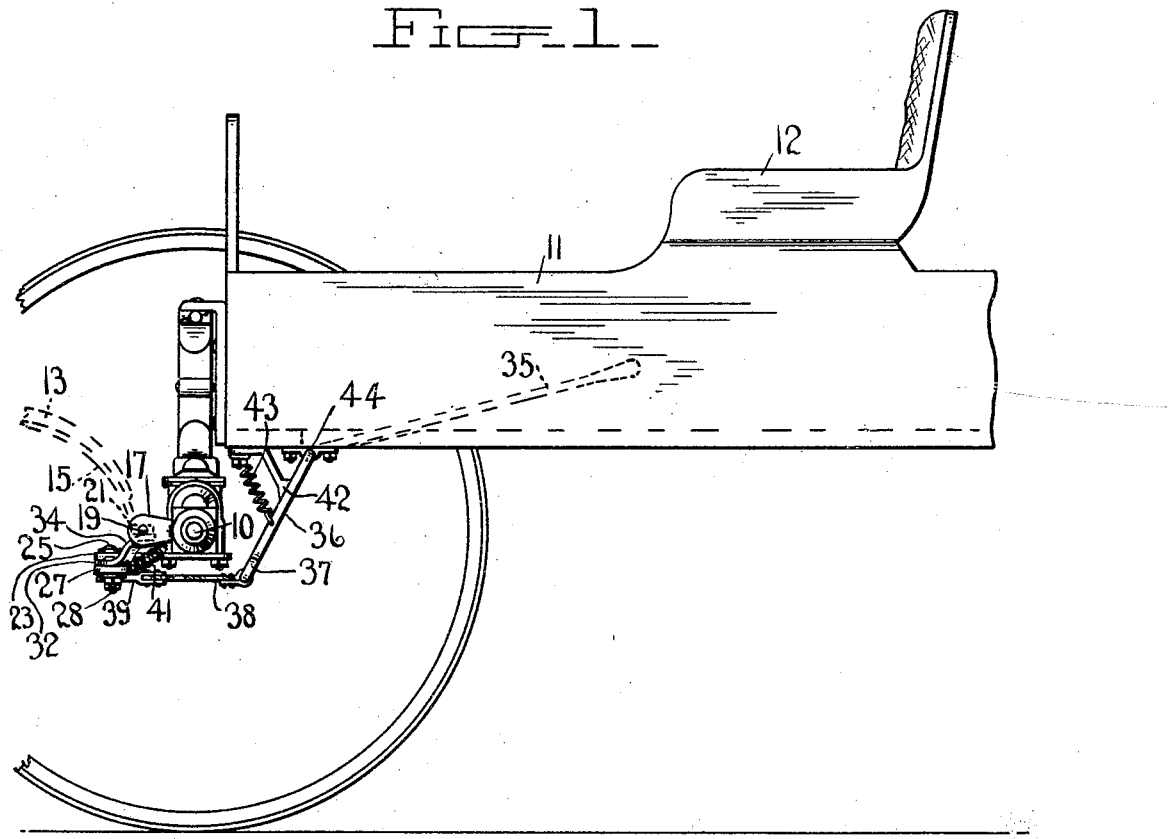
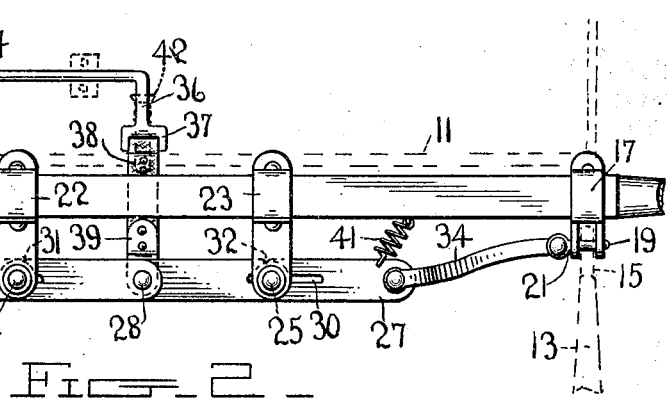
Witnesses
L. B. James
C. N. Woodward
Inventor
Charles E. Beaver
By Chandler & Chandler
Attorneys

UNITED STATES PATENT OFFICE.

CHARLES E. BEAVER, OF BURNHAM, PENNSYLVANIA.

HORSE-RELEASER.

No. 929,275.  Specification of Letters Patent.  Patented July 27, 1909.

Application filed January 7, 1909. Serial No. 471,124.

*To all whom it may concern:*

Be it known that I, CHARLES E. BEAVER, a citizen of the United States, residing at Burnham, in the county of Mifflin, State of Pennsylvania, have invented certain new and useful Improvements in Horse-Releasers; and I do hereby declare the following to be a full, clear, and exact description of the invention, such as will enable others skilled in the art to which it appertains to make and use the same.

This invention relates to devices for detachably coupling the thills or like devices to the running gear of a vehicle, and arranged to be instantly released in event of the horse becoming unruly or attempting to run away, and has for one of its objects to simplify and improve the construction and increase the efficiency and utility of devices of this character.

With this and other objects in view the invention consists in certain novel features of construction as hereafter shown and described and then specifically pointed out in the claim, and in the drawings illustrative of the preferred embodiment of the invention, Figure 1 is a side elevation of the forward portion of the running gear including the forward axle, a portion of the body or box including the seat, and portions of the thills, with the improved device applied. Fig. 2 is a plan view of the parts shown in Fig. 1.

The improved device may be applied to any of the various forms of vehicles, either single or double horse rigs without material structural changes, but for the purpose of illustration is shown applied to a single horse vehicle in which 10 represents the forward axle, 11 the body or box having a seat 12, and 13 represents the thills which are provided with the usual thill irons 14—15 arranged between the ears on clips 16—17, these parts being substantially of the usual form.

Slidably disposed through the ears of the clips 16—17 are bolts 18—19 by means of which the thill irons are coupled to the clips, the bolts having shoulders 20—21 at their inner ends to limit their outward movement, as hereafter explained.

Connected to the axle 10 at points spaced from opposite sides of its center are clips 22—23, the lower plates of which extend forwardly and receive bolts 24—25. Arranged forwardly of the axle 10 are two levers 26—27 overlapping at their inner ends, and coupled by a single bolt 28. The lever 26 is provided with a longitudinal slot 29 bearing over the bolt 24, while the lever 27 is provided with a similar longitudinal slot 30 bearing over the bolt 25.

The levers 26—27 are separated from the bottom plates of the clips 22—23 by spacing washers 31—32 and held in position by nuts engaging the bolts above the levers, as shown. The outer ends of the levers 26—27 are connected to the bolts 18—19 by rods 33—34, the rods being swingingly coupled to the levers and the bolts.

Mounted for oscillation in the bottom of the box 11 is a shaft 44 having a lever arm 35 extending rearwardly at an incline from one end, and an arm 36 extending downwardly through the bottom of the box at the other end. The lever arm 35 will be located convenient to the hand of the driver upon the seat 12, and will be arranged when not in use beneath the upper edge of the body 11, so that it will not be in the way of the driver.

The free end of the arm 36 is provided with a loop 37 and connected in this loop by sewing or riveting is a strap 38, the other end of the strap provided with a clip 39 connected to the bolt 28. Springs 40—41 are connected between the axle and the levers 26—27 to maintain them yieldably in their withdrawn position with the bolts 18—19 in closed position, and coupled to the thill irons 14—15.

Connected to the body 11 is a stop member 42 against which the arm 36 engages when moved into its forward position, to limit the movement of the arm. An additional spring 43 may be applied between the body 11 and the arm 36 if preferred.

With a device thus constructed it will be obvious that so long as the draft animal is moving under normal conditions, the springs 40—41 will retain the bolts 18—19 in coupled relations to the thill irons, but in event of the draft animal becoming unruly, the driver by simply moving the lever arm 35 forwardly will cause the arm 36 to impart a pulling strain upon the strap 38, and move the united inner ends of the levers 26—27 rearwardly beneath the axle and cause the levers to move inwardly by the action of the slots 28—29, and likewise draw the rods 32—33 inwardly and withdraw the bolts 18—19 from engagement with the thill irons and release the draft animal.

The improved device is simple in construction, can be inexpensively manufactured, and applied without material structural changes to vehicles of various sizes, and to vehicles employed for various purposes, and it is not desired to limit the application of the invention to any specific form of vehicle.

What is claimed, is:—

In a device of the class described, the combination with the forward axle of a vehicle, clips connected to the axle near the ends and each clip including spaced apertured ears, pins slidable through said ears, a draft appliance including members located between said ears and engaged by said pins, two arms pivotally united at their inner ends and provided with longitudinal slots intermediate their ends, clips connected to said axle and spaced at each side of the center thereof, studs carried by said clips and extending through said slots, rods movably connected at their ends to said pins and to the outer ends of said arms, a flexible element connected to said arms at their pivoted ends, and means under the control of the driver for actuating said flexible element.

In testimony whereof, I affix my signature, in presence of two witnesses.

CHARLES E. BEAVER.

Witnesses:
 MILES GANOE,
 E. U. HAMILTON.